United States Patent [19]

Kaneko

[11] Patent Number: 5,617,120
[45] Date of Patent: Apr. 1, 1997

[54] TWO-RELATION ICON RANKING AND SELECTING METHOD

[75] Inventor: Satomi Kaneko, Tokyo, Japan

[73] Assignee: Kabushiki Kaisha Toshiba, Kanagawa-ken, Japan

[21] Appl. No.: 938,152

[22] PCT Filed: Mar. 26, 1992

[86] PCT No.: PCT/JP92/00366

§ 371 Date: Jan. 12, 1993

§ 102(e) Date: Jan. 12, 1993

[87] PCT Pub. No.: WO92/17834

PCT Pub. Date: Oct. 15, 1992

[30] Foreign Application Priority Data

Mar. 29, 1991 [JP] Japan .................................. 3-065164

[51] Int. Cl.⁶ .................................................. G06F 17/30
[52] U.S. Cl. .......................................... 395/615; 395/348
[58] Field of Search ..................................... 395/600, 159

[56] References Cited

U.S. PATENT DOCUMENTS 5,226,163  7/1993  Karsh et al. .............................. 395/700

FOREIGN PATENT DOCUMENTS

| 62-194532A | 8/1987 | Japan . |
| 64-32333A | 2/1989 | Japan . |
| 64-8824A | 4/1989 | Japan . |
| 2-114318A | 4/1990 | Japan . |

OTHER PUBLICATIONS

Hankel and Easterby, "Methods for the Design and Evaluation of icons for Human–Computer Interfaces", IEE 2nd International Conference on Command, Control, Communications, and Management Information Systems, 1987, pp. 103–114. Jan. 1987.

"Proceedings of the Sixth Symposium on Human Interface", Tokyo, Japan, Oct. 24–26, 1990, pp. 333–338.

Hanklel & Easterby, "Methods for the Design and Evaluation of Icons for Human–Computer Interfaces", IEE 2nd International Conference on Command Control Communications and Management Information Systems, 1987, pp. 48–52.

Green, P and Pew, R.W., "Evaluating Pictographic Symbols: An Automotive Application", Human Factors, v 20, No. 1, Feb. 1978, pp. 103–114.

Webb et al., "An Empirical Approach to the Evaluation of Icons", *SIGCHI Bulletin*, vol. 21, No. 1, Jul. 1989, pp. 87–90.

Nolan, P.R., "Designing Screen Icons: Ranking and Matching Studies", *Proceedings of The Human Factors Society 33rd Annual Meeting*, Denver Colorado, Oct. 1989 pp. 380–384.

(List continued on next page.)

*Primary Examiner*—Thomas G. Black
*Assistant Examiner*—Paul R. Lintz
*Attorney, Agent, or Firm*—Finnegan, Henderson, Farabow, Garrett & Dunner, L.L.P.

[57] ABSTRACT

An object (icon) selecting method selects an object of a pictorial pattern for use in designing a pictorial symbol representing a system function. The method includes a first step of associating a system function with objects representing pictorial symbols, a second step for calculating relation of each associated object and the system function, a third step for narrowing down associated objects to an object with high relation with the system function in accordance with a predetermined criterion based on the relation, a fourth step for associating each narrowed object with a functional element, a fifth step for calculating relation of each associated functional element and each of the objects, and a sixth step for selecting an object which is easily associated with the system function from the objects in accordance with a predetermined criterion based on the relation and determining an object representing the system function. As a result, objects that the users can correctly understand as relevant to system functions can be selected.

8 Claims, 16 Drawing Sheets

OTHER PUBLICATIONS

Hendrika, Alice Eisen, "Iconer: A Tool for Evaluating Icons", *SIGCHI Bulletin*, vol. 21, No. 3, Jan. 1990, pp. 23–25.

Magyar, Regis L., "Assessing Icon Appropriateness and Icon Discriminability with a Paired–Comparison Testing Procedure", *Proceedings of the Human Factors Society 34th Annual Meeting*, Oct. 8–12, 1990, Orlando, Florida, pp. 1204–1208.

Salasoo, Aita, "Towards Usable Icon Sets: A case study from Telecommunications Engineering", *Proceedings of the Human Factors Society 34th Annual Meeting*, Oct. 8–12, 1990, Orlando Florida, pp. 203–207.

Kaneko et al., "Approach to Designing Easy–To–Understand Icons", *Proceedings IEEE Workshop on Visual Languages*, 8–11 Oct. 1991, Kobe, Japan, pp. 246–253.

FIG. 4

SELECT OPERATION TO EXECUTE.

1. REQUIREMENT DEFINITION FUNCTION

2. EXTRACT OBJECT ALTERNATIVES

3. SELECT OBJECT

4. END

FIG. 10
208
ERASE CHARACTER
RUBBER ERASER, CORRECTION LIQUID, DELETE LINE 
RUBBER ERASER, CORRECTION LIQUID 
RUBBER ERASER, DELETE LINE, CORRECTION LIQUID 
... :
CALCULATE VALUE
CALCULATOR, COMPUTER, ABACUS 
CALCULATOR, ABACUS, NUMERAL 
COMPUTER, CALCULATOR, ABACUS 
... :
DRAW FIGURE
RULE, COMPASS, SETSQUARE 
PENCIL, RULE, SETSQUARE 
"HANAKO", COMPASS, RULE 
... :

FIG. 11

```
(ERASER CHARACTER  (RUBBER ERASER      32)
                   (CORRECTION LIQUID  17)
                   (DELETE LINE        13)
                        ...            ))
(CALCULATE VALUE   (CALCULATOR         28)
                   (COMPUTER           15)
                   (ABACUS             20)
                   (NUMERAL            5)
                        ...            ))
(DRAW PICTURE      (RULE               26)
                   (COMPASS            15)
                   (SETSQUARE          19)
                   (PENCIL             7)
                   ("HANAKO"           3)
                        ...            ))
```

(ERASE CHARACTER : RUBBER
                              ERASER)

(CALCULATE VALUE : CALCULATOR,
                              ABACUS)

(STORE DOCUMENT : FOLDER)

TWO-RELATION ICON RANKING AND SELECTING METHOD

TECHNICAL FIELD

The present invention relates to an object selecting method for selecting pictorial symbols such as icons which visually represent system functions (the pictorial symbols are hereinafter referred to as objects).

RELATED ART

As an example, icons for use in computers will be described. When an icon which represents a particular system function is created, its pictorial pattern is determined and then created.

Thus far, a system designer selected an object that he thought that the object strongly related to a particular system function he wanted to represent therewith. For example, as an icon which represented a function "creating a document", an object "pencil" which adequately represented a function "write" was selected in most cases.

As another conventional method for selecting an object, a system designer prepared a plurality of objects which represented system functions as pictorial patterns and had evaluators who could become users of the system evaluate the understandability of the function. As the result of the evaluation, the system designer selected an object with which the evaluators could most highly associate the system function.

In the former method where a system designer selected an object which highly related to a system function, it can be said that an object with high relation is selected in the direction <function→object>. However, in the conventional real icon using environment, users understood the functions through objects which were represented with icons on a display screen. Thus, the users associated objects with functions, that is, they had association in the direction <object→function>. When there are two matters (A and B) and a person associates one matter (A or B) with other matter (B or A), the intensity of association in the direction <A→B> would differ from that in the direction <B→A>. Thus, it could not be assured that objects which were selected in such a conventional method caused the users to correctly understand system functions. Thus, when objects which were selected by the conventional association in the direction of <function→object> were used, the users would associate them with different functions or might associate them with no functions.

Actually, as a result of evaluations of understandability of pictorial patterns of icons, it was known that there were ununderstandable icons which were conventionally used such as a "brush" icon which represented the selection of a drawing brush, and a "bag" icon which represented the selection of a file management.

On the other hand, in the latter method where evaluators selected adequate objects from their alternatives which were proposed by a system designer, all of the alternatives presented by him might be inadequate. In this situation, the evaluators might select objects with which they could most highly associate the system functions. Thus, the evaluators (that is, the users) could not select objects that they could most highly associate with the system functions.

Therefore, an object of the present invention is to provide an object selecting method for selecting objects by which users can correctly understand relevant system functions.

DISCLOSURE OF THE INVENTION

The object selecting method of the present invention is an object selecting method for selecting an object of a pictorial pattern for use in designing a pictorial symbol representing a system function is disclosed which comprises a first step of associating a system function with objects representing pictorial symbols, a second step for calculating relation of each associated object and said system function, a third step for narrowing down associated objects to an object with high relation with said system function in accordance with a predetermined criterion based on said relation, a fourth step for associating each narrowed object with a functional element, a fifth step for calculating relation of each associated functional element and each of said objects, and a sixth step for selecting an object which is easily associated with said system function from said objects in accordance with a predetermined criterion based on said relation and determining an object representing said system function. In the object selecting method of the present invention, objects with which users can associate a relevant system function are narrowed in accordance with the relation of <function→object>. The relation of <object→function> where the users associate the narrowed objects with a functional element is used as a final selection criterion. Thus, objects which accord with the real icon using environment can be evaluated. Consequently, objects which the users correctly understand relevant system functions can be selected.

BRIEF DESCRIPTION OF DRAWINGS

FIG. 4 is a view showing an example of an initial screen of an object selecting system;

FIG. 10 is a view showing an example of an object data file;

FIG. 11 is a view showing an example of an object relation score file;

FIG. 14 is a view showing an example of a selection record file;

BEST MODES FOR CARRYING OUT THE INVENTION

Next, with reference to the accompanying drawings, the present invention will be described in detail.

(Embodiment 1)

Figure 1:
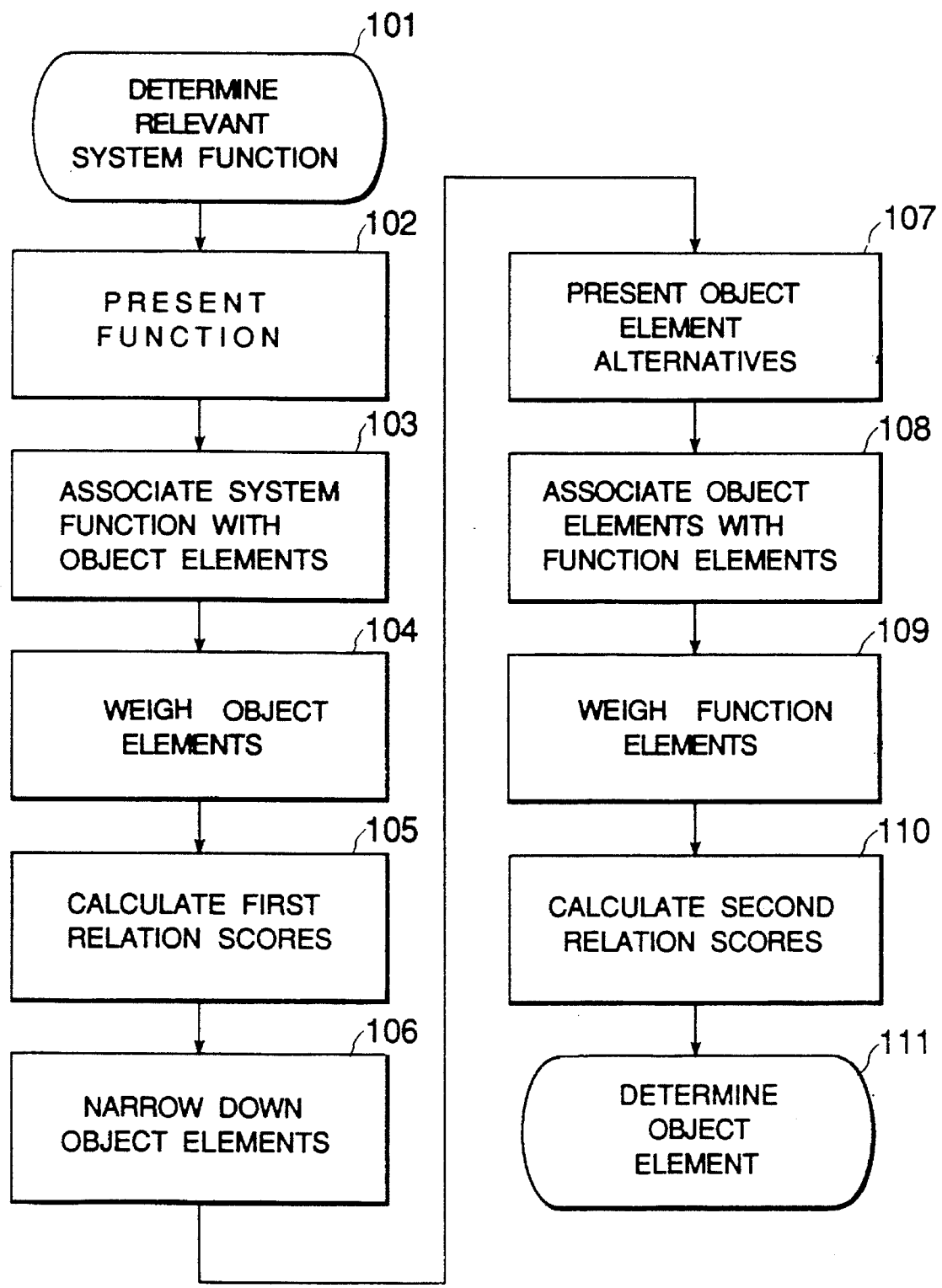
FIG. 1 is a flow chart showing a logical flow of an object selecting method of an embodiment in accordance with the present invention.

FIG. 1 is a flow chart showing a flow of an object selecting method of an embodiment in accordance with the present invention. In this embodiment, the case where objects used for pictorial patterns of icons which represent system functions of a computer system is considered.

First, a system function represented with an icon is determined (in step 101). In this case, the system function represented with the icon is "store document".

Next, a plurality of evaluators are designated. The determined system function is presented to the evaluators by a verbal means (in step 102). When the evaluators are designated, people who can become the users of the system to be developed should be selected so as to create icons the users can easily understand. In addition, when the system function is presented, a general verb which represents the motion of the function (or a phrase consisting of the verb and an objective word) is used as a stimulating word (or phrase). The presentation means visually presents the stimulating word to the evaluators (on a display screen or on a printer hard copy). Alternatively, the presentation means reads out the stimulating word to the evaluators.

Then, each evaluator replies a plurality of objects with which he associated the presented system function (in step 103). For example, with respect to the system function "store document", it is supposed that objects such as a folder, a drawer, and a shelf be replied. In this case, the number of replies is limited for example up to three. As a reply means, each evaluator writes down his replies on a piece of paper. Alternatively, each evaluator speaks their replies to record them.

Thereafter, each object replied is weighed so as to represent the relation with the system function "store document" (in step 104). In this case, the three objects replied by each evaluator are weighed with "3", "2", and "1" in the order of replies.

Next, the total point of the designated weights for each object replied are calculated (in step 105). This total point is treated as a relation score of <function→object> (hereinafter referred to as an object relation score). By cumulating the weights of each object replied by each evaluator, a histogram showing the weights of each object of each system function is formed as an object relation score.

Then, by using each object relation score, objects which relate to the system function are narrowed down in accordance with a particular criterion (in step 106). Now, assume that the following reply results of the system function "store document" are obtained.

| System function | "Store document" | | | |
| --- | --- | --- | --- | --- |
| Replied objects | O1 | O2 | ... | On |
| Object relation score | R1 | R2 | ... | Rn |
| Cumulated relation score | AR1 | AR2 | ... | ARn |

Figure 2:
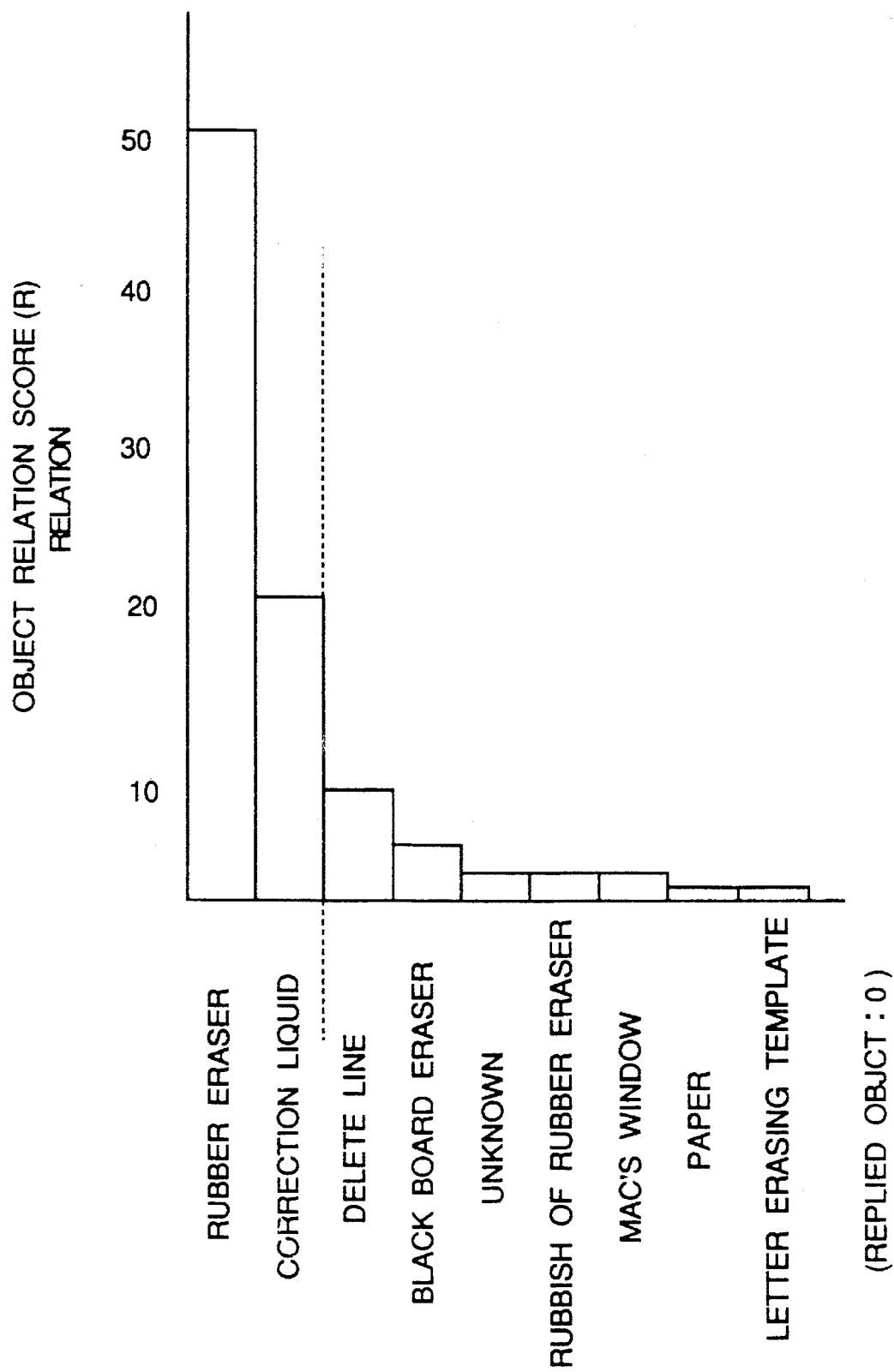
FIG. 2 is a diagram showing a relation between score graph of objects replied and the conception of criteria for categorizing them as alternative objects.

In an icon evaluation study conducted by the inventor of the present invention, when objects are arranged in the order of higher weight scores, the scores exponentially decrease. To narrow down objects which strongly relate to the function "store document" from all replied objects which relate to the function "store document", it is necessary to use a criterion which separates objects which strongly relate to the relevant function from other objects as shown in FIG. 2. FIG. 2 shows replies of a system function "erase character" and the relation degree. In the figure, a dotted line represents the criterion.

In this case, objects are selected in the order of higher scores until the cumulated value of the relation scores becomes the half of the total value. The selected objects are used in the following steps. Specifically, objects O1 to Ox are selected as object alternatives until the cumulated value ARx of the relation score satisfies the following condition.

$$ARx >= ARn/2 \ \&\& \ AR(x-1) <= ARn/2$$

Next, the objects selected in the step 106 as the alternatives are presented to the evaluators by the verbal means (in step 107). At this point, the following conditions should be satisfied:

(1) if the evaluators in the step 107 differ from those in the step 102, they should be also people who can become users of the system to be developed, and (2) if the evaluators in the step 107 are the same as those in the step 102, the step 107 should be conducted at a predetermined interval (for example, one week or more).

The object presentation means in the step 107 may be a visual means or the verbal means like the step 102.

Then, each evaluator replies a plurality of functions with which he associates the presented object (in step 108). For example, with respect to an object "folder", it is supposed that functions such as "keep document", "classify/sort document", and "open" be replied. In this case, the number of replies is limited for example up to three. At this point, the same replying method as the step 103 is used.

Thereafter, each function replied is weighed so as to represent the relation with the object "folder" (in step 109). In this case, each function replied by each evaluator is weighed with "3", "2", and "1" in the order of replies.

Next, a total point of the designated weights for each function replied is calculated (in step 110). This total point is referred to as a relation score of <object→function> (or a function relation score).

Then, by using each function relation score, an object with which each evaluator most highly associates the system function "store document" is selected in accordance with a particular criterion (in step 111). When there is a reply of "store document" as a functional reply for a particular object, if the relation score of "store document" is higher than that of other functional replies for the same object, this object is selected as the object which the evaluators easily associate with the function "store document".

For example, assume the case where the following replies are obtained when three objects "folder", "drawer" and "book shelf" are presented.

| Object | "Folder" | | | |
| --- | --- | --- | --- | --- |
| Replied function | Store | Open | Close | ... |
| Functional relation score (descending order) | x1 | x2 | x3 | ... |
| Object | "Drawer" | | | |
| Replied function | Pull | Open | Store | ... |
| Functional relation score (descending order) | y1 | y2 | y3 | ... |
| Object | "Shelf" | | | |
| Replied function | Place | Arrange | Decorate | ... |
| Functional relation score (descending order) | z1 | z2 | z3 | ... |

The above-mentioned "store" represents a function equivalent to the system function "store document".

As a result, the evaluators most easily associate the "folder" with the "store". In addition, the evaluators associate "drawer" more easily with the "pull" and "open" than with the "store". Moreover, the evaluators do not easily associate "book shelf" with the function "store". When the above-mentioned criterion is applied to these results, the "folder" is selected as an object which most adequately represents "store document".

Assume the case where a plurality of objects are selected as the result of the object narrow-down stage of the step 106. When it is determined that only one object is adequate for the pictorial pattern of an icon of a relevant system function as the result of the step 111, the result of determination based on the relation scores of <object→function> in the step 111 has the highest priority over the result of the determination of the relation scores of <function→object> of the objects in the step 106.

In the final object selection of the step 111, when all object alternatives such as "folder" and "drawer" have the higher relation score of the system function "store document" than the relation scores of other functions replied, all the object alternatives may be selected as pictorial patterns of the system function "store document". When a plurality of objects are selected in the final step of this method, the system designer should select one of them by considering the application field and the relevant users of the system to be developed.

(Embodiment 2)

Figure 3:
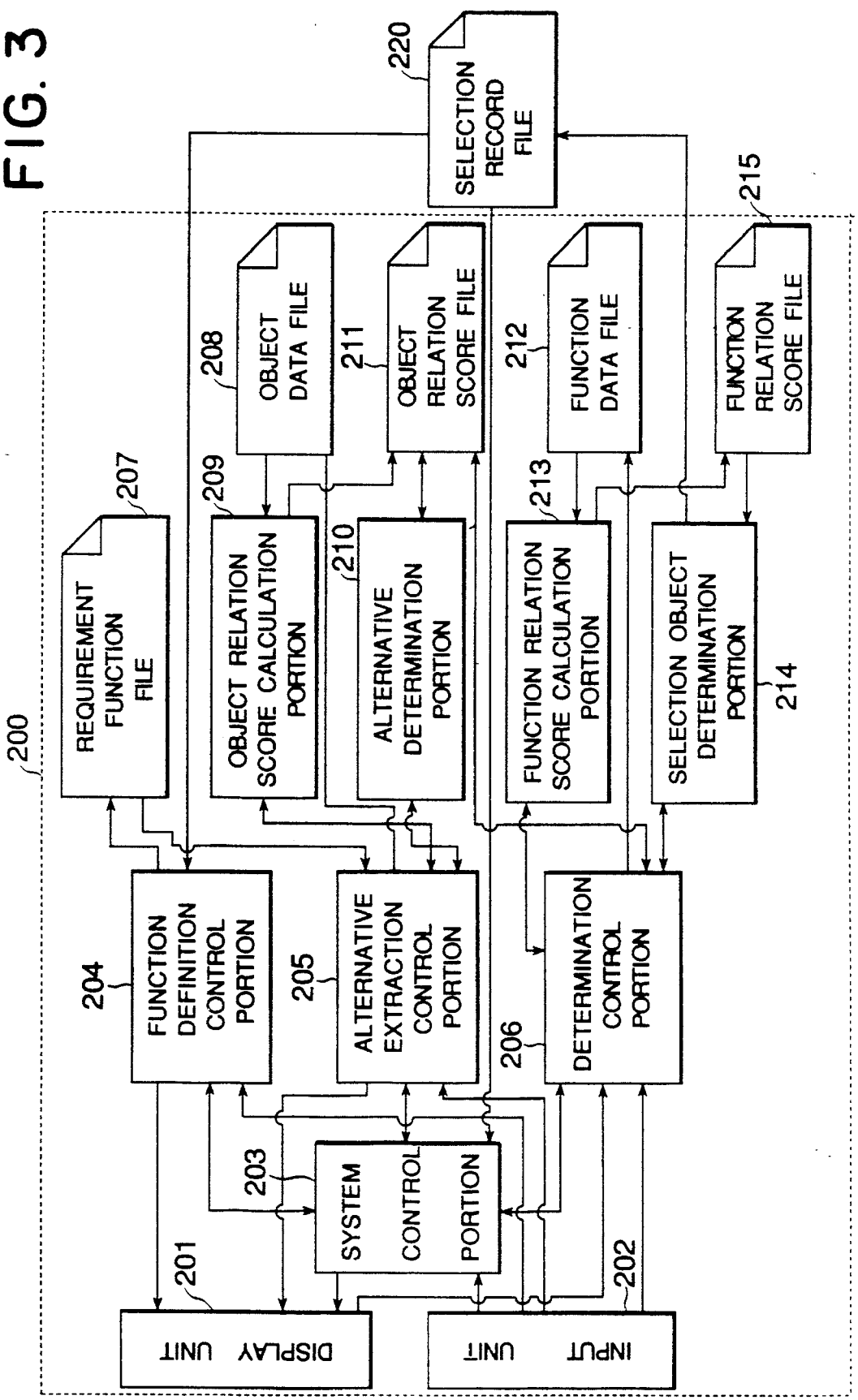
FIG. 3 is a block diagram showing the construction of a system of a second embodiment.

FIG. 3 is a block diagram showing an embodiment of an object selecting system which executes an object selecting method of the present invention with the use of a computer. Hereinafter, a person who uses this system and performs various operations necessary for selecting objects is referred to as an operator. In addition, a person who is presented with a stimulating word in an object selecting process, associates it with a matter, and inputs the matter into the system is referred to as an evaluator. In the system according to the embodiment, an object selection file generation portion 200 determines whether or not a two-way relation of a function and an object is satisfied. Object selection data whose selection is verified is stored in a selection record file 220.

Next, with reference to FIG. 3, each constituent block of the object selecting system will be described.

A display unit 201 displays output results of each control portion, messages to the operator and the evaluators, stimulating words presented to the evaluators, and so forth.

An input unit 202 is used to preform various operations, such as starting/stopping the system, designating an operation, designating a file, selecting and executing an object inputting objects replied by each evaluator.

Figure 5:
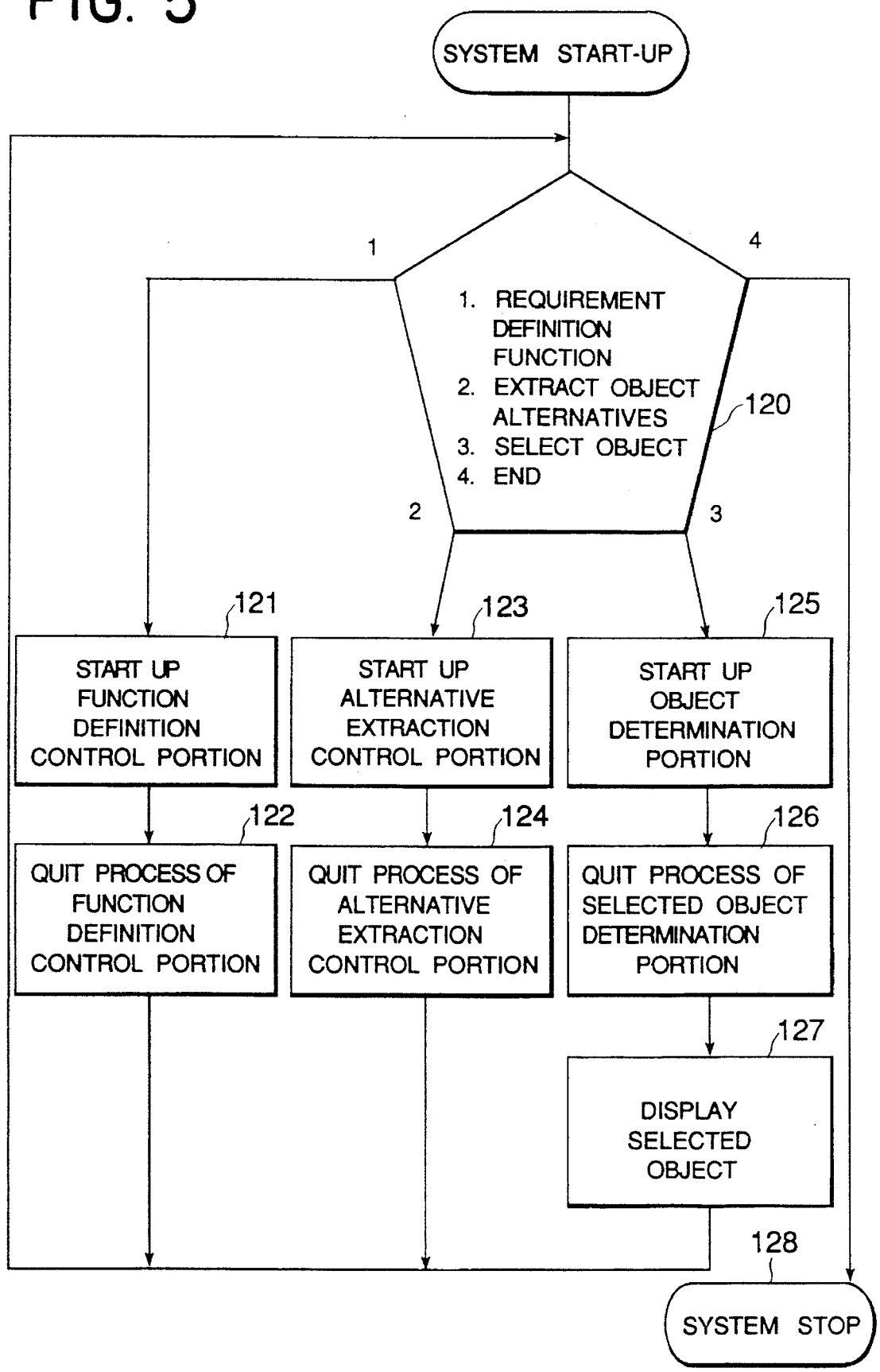
FIG. 5 is a flow chart showing a control flow of a system control portion.

When the operator starts up the object selecting system by using the input unit 202, a system control portion 203 receives this operation information and sends to the display unit 201 a display command for displaying a menu as shown in FIG. 4. Then, as shown in a flow chart of FIG. 5, depending on the selection of the menu shown in FIG. 4 (in step 120), the following operation is performed. When "1. Requirement definition function" is selected, a start-up command is sent to a function definition control portion 204 (in step 121) and an end message is received (in step 122). When "2. Extract object alternatives" is selected, a start-up command is sent to an alternative extraction control portion 205 (in step 123) and an end message is received (in step 124). When "3. Select object" is selected, a start-up command is sent to a determination control portion 206 (in step 125) and an end message is received (in step 126). When a final message representing the end of the object selection is received from the determination control portion 206, a display command for displaying a selected object which is stored in a selection record file 220 as a selection result is sent to the display unit 201 (in step 127). When "4. End" is selected, control for quitting the process of the object selecting system is performed (in step 128).

The function definition control portion 204 performs control for forming a requirement function file 207 in accordance with an input requirement function.

Figure 6:
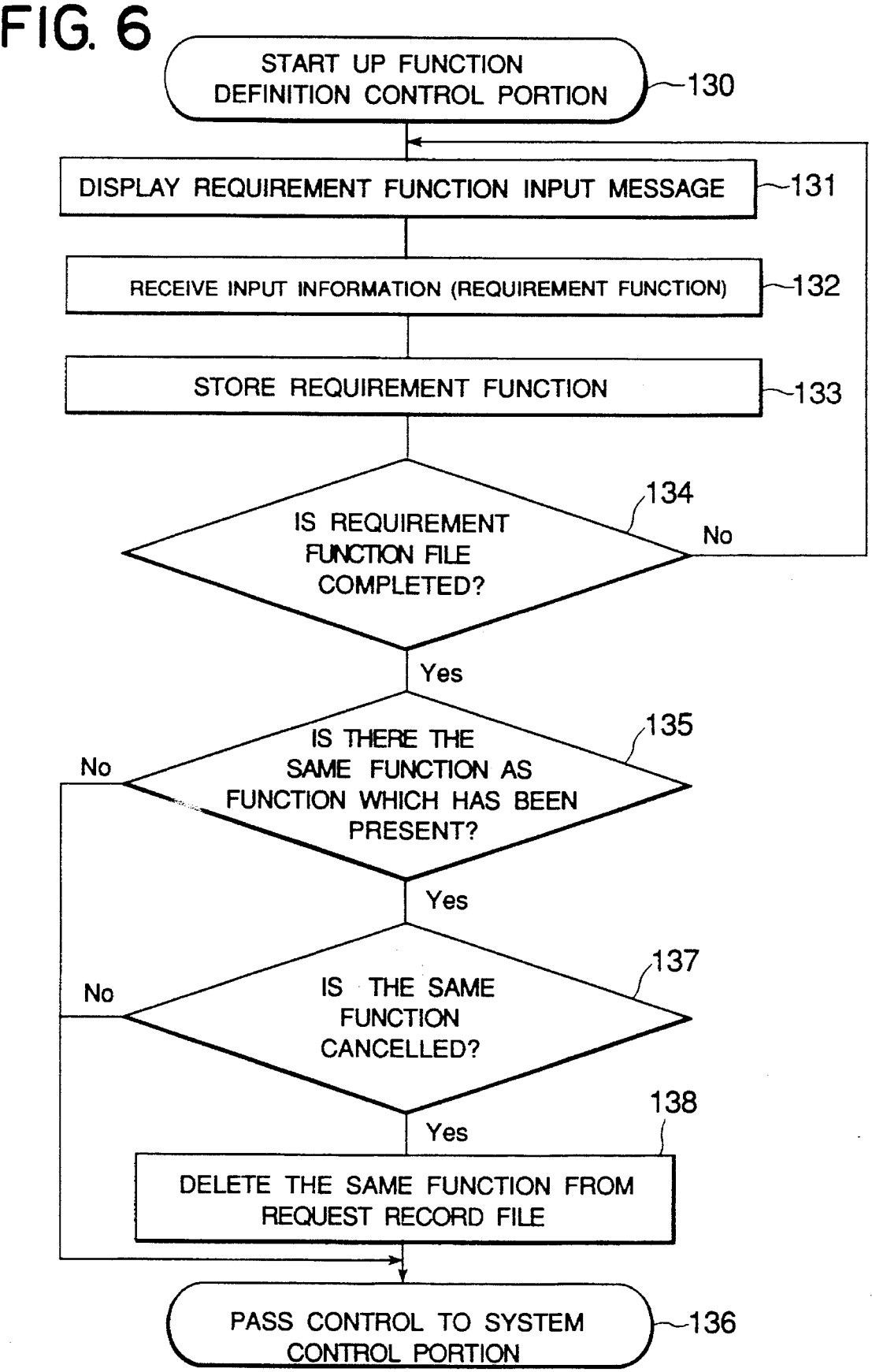
FIG. 6 is a flow chart showing a control flow of a function definition control portion.

In other words, as shown in a flow chart of FIG. 6, when the function definition control portion 204 is started up by the start-up command received from the system control portion 203 (in step 130), it sends to the display unit 201 a message display command prompting the operator to input a request system function with respect to the selection of objects (in step 131).

When the function definition control portion 204 receives input information of the request system function from the input unit 202 (in step 132), it stores this information in the requirement function file 207 in accordance with a predetermined format (in step 133).

The steps from the input of requirement function to the storage in file are repeated until the function definition control portion 204 receives input information representing "End of creating requirement function file" which is input by the operator through the input unit 202 (in step 134).

When the "End of creating requirement function file" is input, the function definition control portion 121 references system functions stored in the selection record file 220 which stores the relation of requirement functions and selected objects and then determines whether or not an object has been selected for the same system function (in step 135).

When the same system function has not been stored in the selection record file 220, the function definition control portion 121 passes the control to the system control portion 203 (in step 136).

On the other hand, when the same system function has been stored in the selection record file 220, the function definition control portion 121 presents the object to the operator and then prompts the operator to select one of the following two operations (1) and (2) (in step 137):

(1) to cancel the requirement function of the system function which is input, or (2) to select an object with respect to the system function being input.

When the operation (1) is selected, the function definition control portion 121 deletes the new system function designated by the operator from the requirement function file 207 (in step 138) and passes the control to the system control portion 203 (in step 136).

On the other hand, when the operation (2) is selected, the function definition control portion 121 quits the process and passes the control to the system control portion 203 (in step 136).

Figure 7:
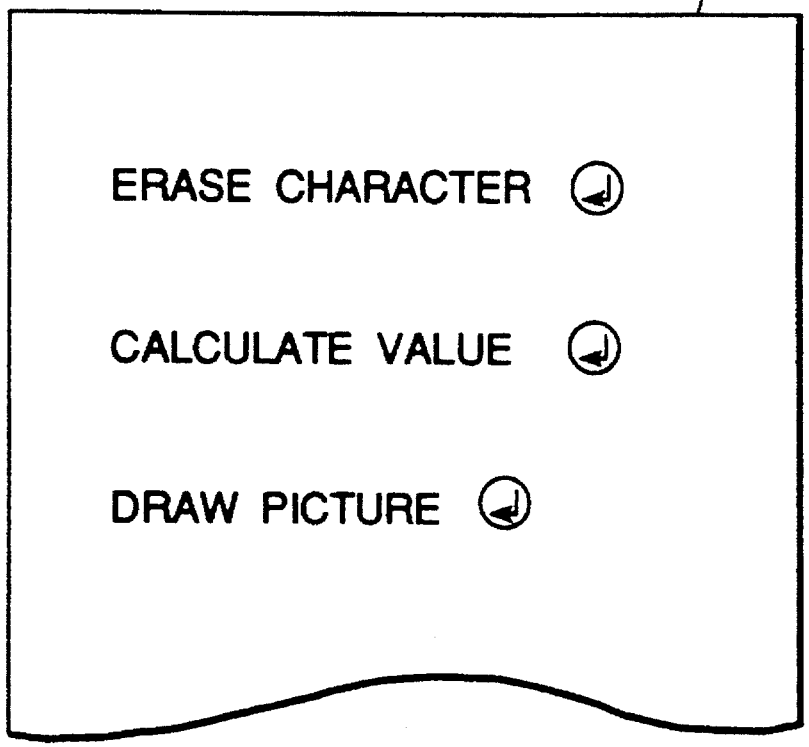
FIG. 7 is a view showing an example of a requirement function file.

The requirement function file 207 functions as buffer memory and stores text data of an icon representing a system function. When necessary, this requirement function file 207 can be divided into a plurality of sub-files. FIG. 7 shows an example of the requirement function file 207.

Figure 8:
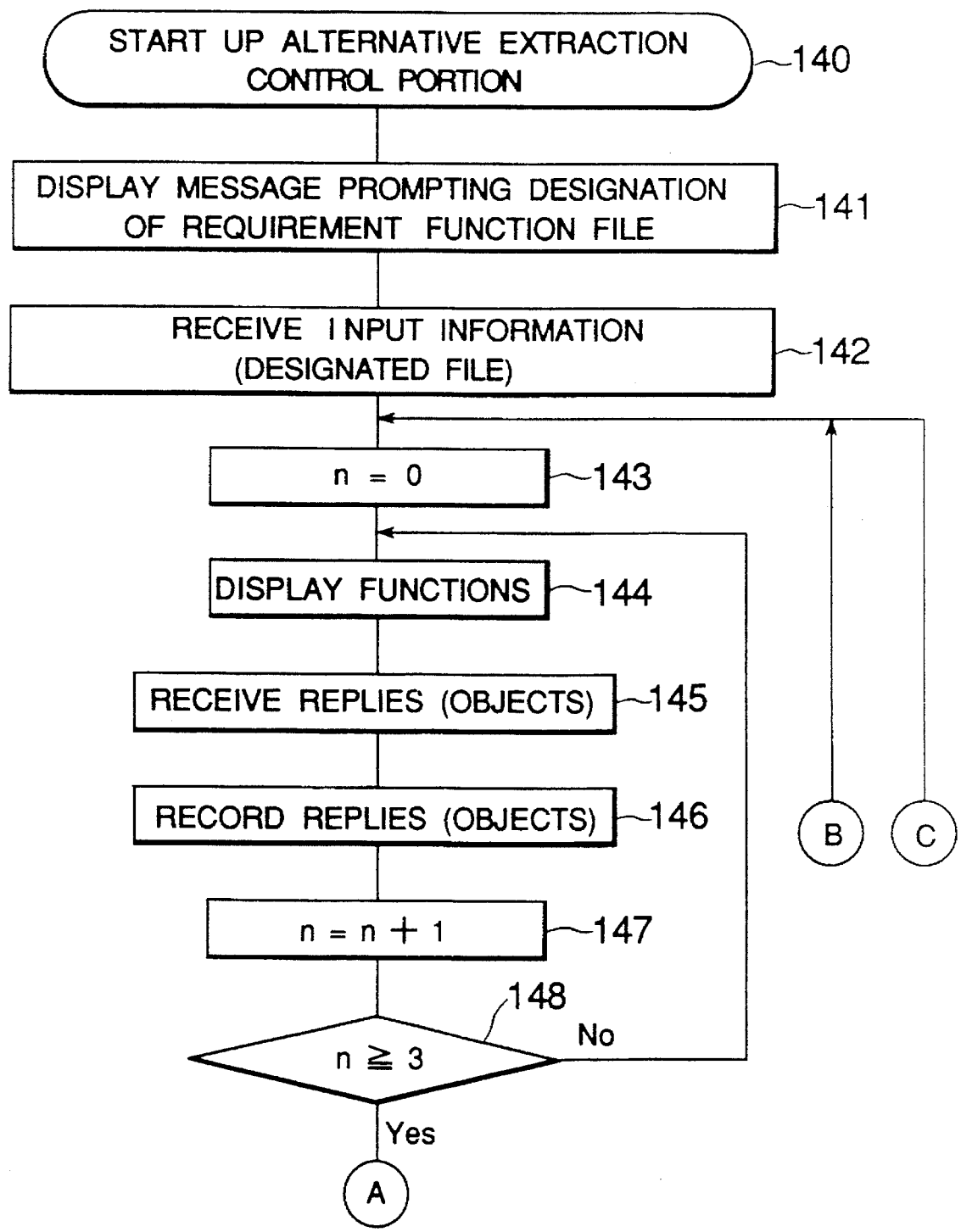
FIG. 8 is a flow chart (first half) showing a control flow of an alternative extraction control portion.
Figure 9:
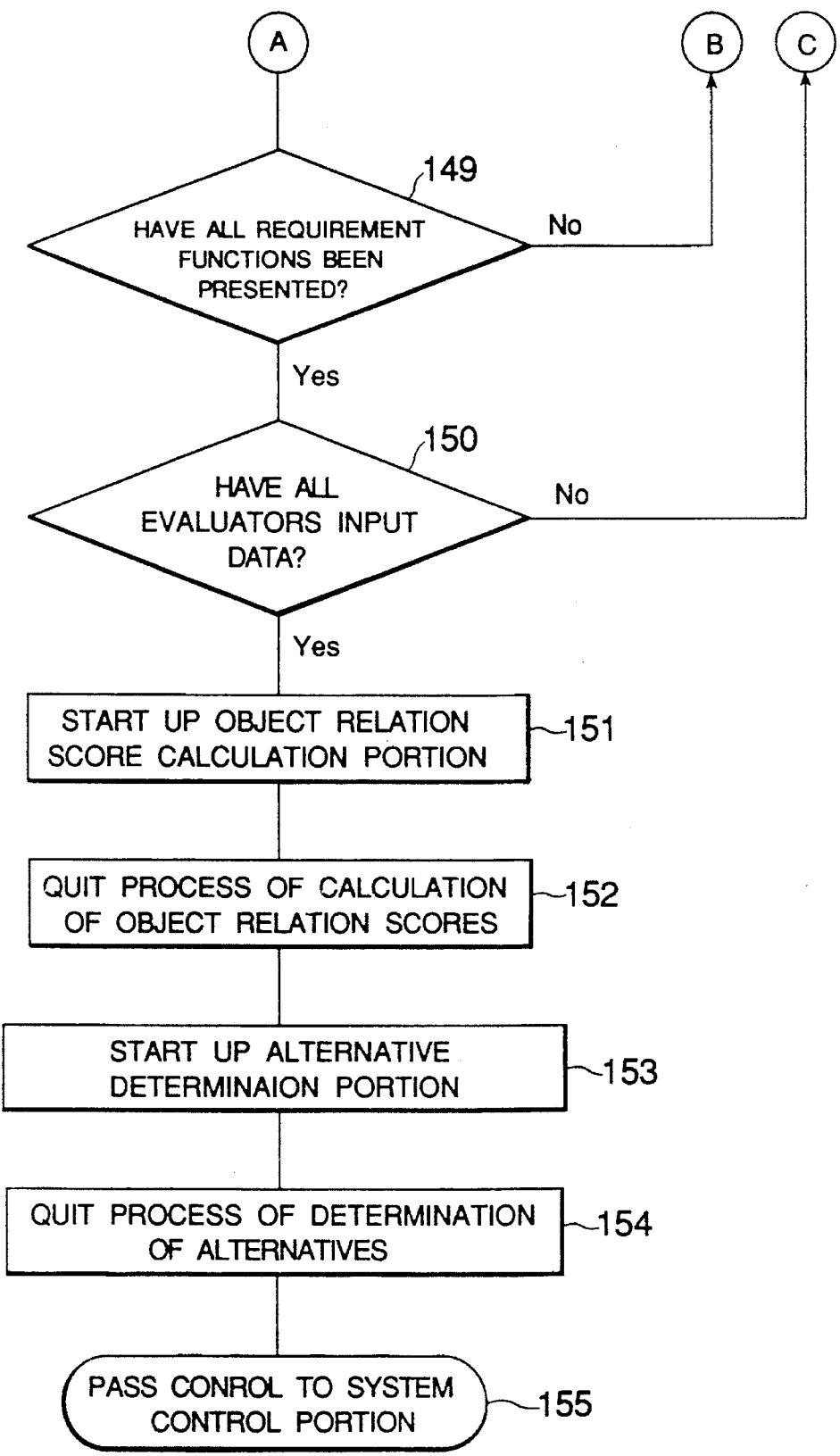
FIG. 9 is a flow chart (second half) of FIG. 8.

Next, with reference to a flow chart (first half and second half) of FIGS. 8 and 9, the process of the alternative extraction control portion 205 will be described.

When the alternative extraction control portion 205 receives the start-up command from the system control portion 203 (in step 140), it causes the message display unit 201 to display a message prompting the operator to designate one of the requirement function files 207 (in step 141).

When the alternative extraction control portion 205 receives input information (designated file) from the input unit 202 (in step 142), it sets an object reply number n to zero (in step 143) and reads the content of the relevant requirement function file 207 into memory in accordance with the designated information. Thereafter, the alternative extraction control portion 205 sends to the display unit 201 a command for displaying one of functions of the designated file thereon (in step 144).

When an evaluator inputs an object with which he associates the system function being displayed as his reply, the alternative extraction control portion 205 receives the object information through the input unit 202 (in step 145) and stores it in the object data file 208 (in step 146).

Thereafter, the alternative extraction control portion 205 increments the object reply number n by 1 (in step 147). The alternative extraction control portion 205 repeats the above-mentioned process until the object reply number n of the same function becomes 3 (in step 148).

After the alternative extraction control portion 205 has received three object replies of the same function, it determines whether all the requirement functions in the requirement function file 207 have been presented (in step 149). When there is still a requirement function, the alternative extraction control portion 205 repeats the process starting with the step 143 so as to store and control similar reply objects.

After the alternative extraction control portion 205 has presented all the requirement functions, it repeats the process starting with the step 143 until a predetermined number of evaluators have input their replies (in step 150).

When the operator determines that the predetermined number of evaluators have input their replies and inputs "End of replying objects", the alternative extraction control portion 205 receives this input information and starts up an object relation score calculation portion 209 (in step 151).

Thereafter, when the alternative extraction control portion 205 receives a message representing "End of calculating relation score" from the object relation score calculation portion 209 (in step 152), it starts up an alternative determination portion 210 (in step 153).

When the alternative extraction control portion 205 receives a message representing "End of determination" from the alternative determination portion 210 (in step 154), it quits the process of the object alternative extraction control and passes the control to the system control portion 203 (in step 155).

The object data file 208 is used to store objects (rubber eraser, correction liquid, calculator, ruler, etc.) replied in accordance with functions ("erase character", "calculate value", "draw picture", etc.) presented through the display unit 201 as shown in FIG. 10.

When the object relation score calculation portion 209 receives the start-up command from the alternative extraction control portion 205, it stores the content of the object data file 208 in memory and calculates the relation score of each object replied in accordance with each system function. The object relation score calculation portion 209 calculates the relation score in the same manner as that in the embodiment 1.

(1) weigh three objects replied in accordance with each system function by each evaluator with values 3, 2, and 1 in the input order, and (2) calculate the total of weights designated to each object (total point=relation score of each object).

The object relation score calculation portion 209 stores in an object relation score file 211 the resultant object relation scores as objects and their score values (eraser: 32, correction liquid: 17, delete line: 13, etc.) according to functions ("erase character", "calculate value", "drawing picture", etc.) as shown in FIG. 11. Thereafter, the object relation calculation portion 209 sends a message representing "End of calculating object relation scores" to the alternative extraction control portion 205 and quits the process.

When the alternative determination portion 210 receives the start-up command from the alternative extraction control portion 205, it reads the content of the object relation score file 211 and selects objects with high relation scores replied in accordance with a relevant system function until the total score of objects selected becomes the half of the total relation score. Now, assume that the follow results could be obtained for a particular system function (Function_A).

| System function | Function_A | | | |
|---|---|---|---|---|
| Replied object | O1 | O2 | ... | On |
| Object relation score (descending order) | R1 | R2 | ... | Rn |
| Cumulated value of relation score | AR1 | AR2 | ... | ARn |

At this point, the alternative determination portion 210 extracts objects O1 to Ox which satisfy the following condition as object alternatives.

$$ARx >= ARn/2 \ \&\& \ AR(x-1) <= ARn/2$$

The alternative determination portion 210 sets an alternative object flag for the extracted objects in the object relation score file 211. Thereafter, the alternative determination portion 210 sends a message representing "End of extracting alternatives" to the alternative extraction control portion 205 and quits the process.

Figure 12:
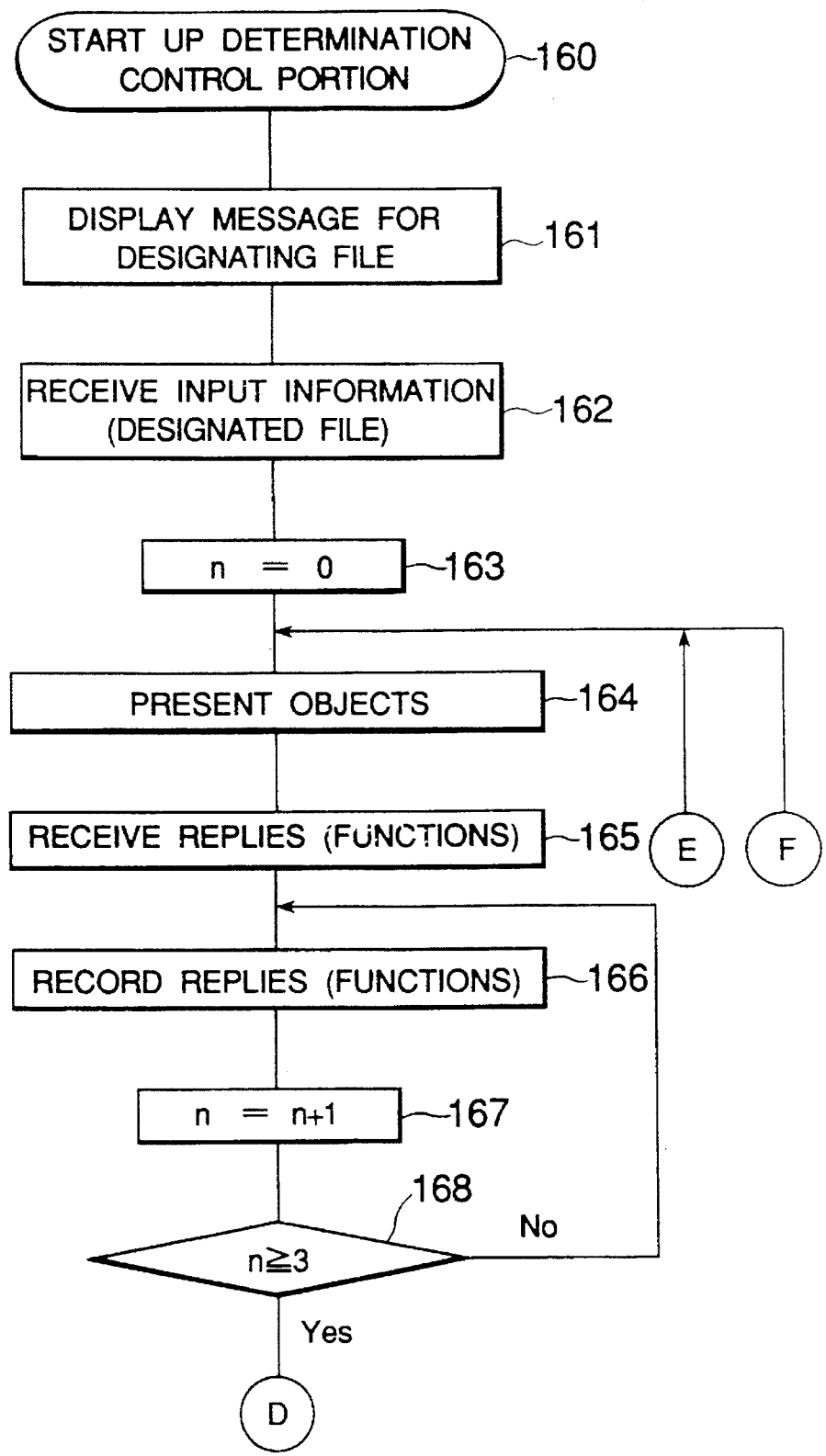
FIG. 12 is a flow chart (first half) showing a control flow of a determination control portion.
Figure 13:
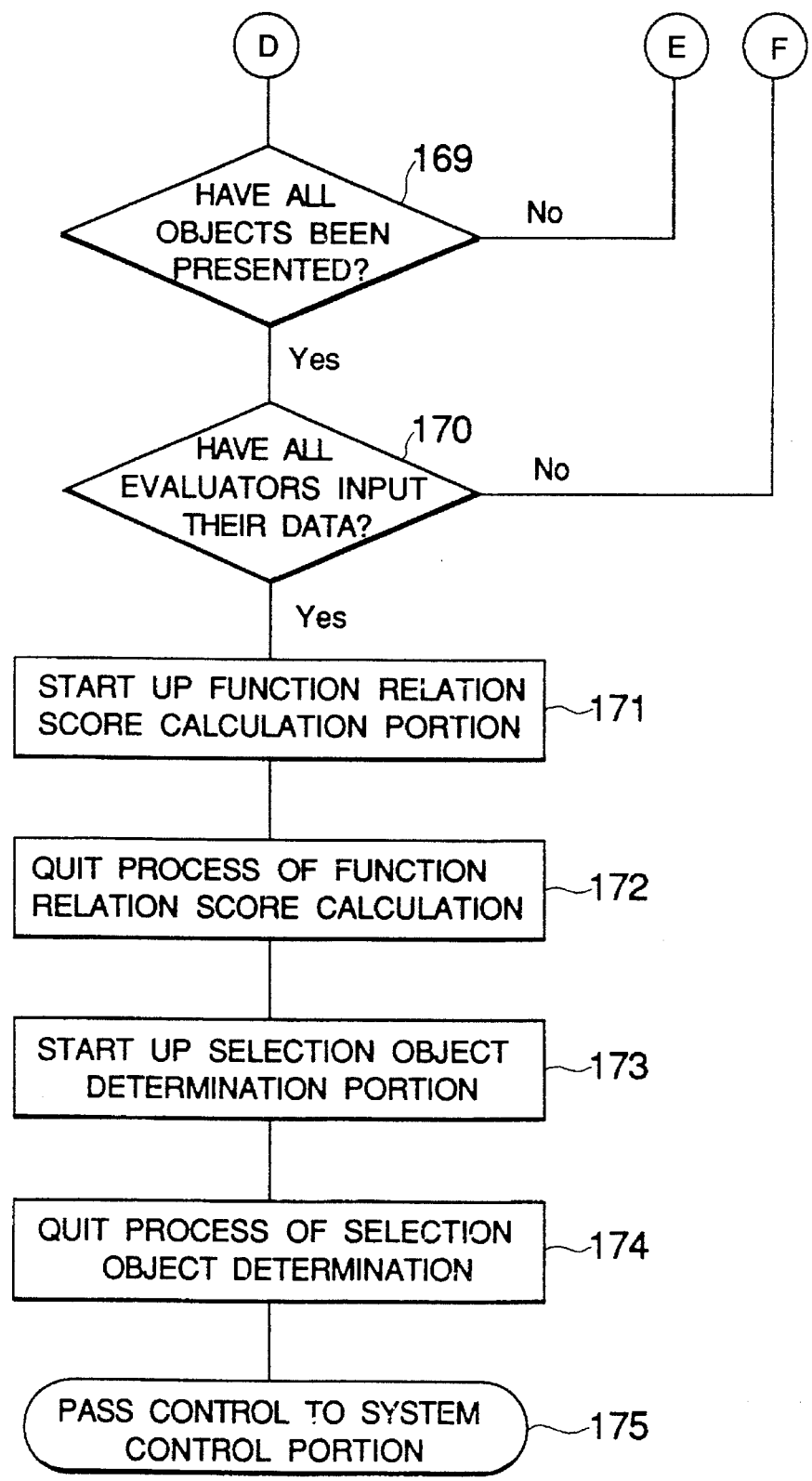
FIG. 13 is a flow chart (second half) of FIG. 12.

Next, with reference to a flow chart (first half and second half) shown in FIGS. 12 and 13, the process of the determination control portion 206 will be described.

When the determination control portion 206 receives the start-up command from the system control portion 203 (in step 160), it causes the display unit 201 to display a message prompting the operator to designate one of the object relation score files 211 (in step 161).

Next, when the determination control portion 206 receives from the input unit 202 the designated information of the object relation score file (in step 162), it sets the reply number n to zero (in step 163). In addition, the determination control portion 206 accesses the relevant object relation score file 211 in accordance with the input information and causes the display unit 201 to display one of objects with the alternative object flag being set in the file so as to present it to an evaluator (in step 164).

When the evaluator inputs a function with which he associates the object displayed to the input unit 202, the determination control portion 206 receives the information of the function through the input unit 202 (in step 165) and stores the information in a function data file 212 (in step 166).

Thereafter, the determination control portion 206 increments the object reply number n by 1 (in step 167) and repeats the above-mentioned steps until the reply number n of functions according to the same object becomes "3" (in step 168).

After the determination control portion 206 has received three replies of functions according to the same object, it determines whether or not the relevant object relation score file has an object with the alternative object flag which has not been presented, that is, whether or not all the objects which have been extracted as alternatives have been presented (in step 169). When there is still an object which has not been presented, the determination control portion 206 repeats the process starting with the step 163 so as to present the next object and store and control the similar replies of functions.

After all the relevant objects have been presented, the determination control portion 206 repeats the process starting with the step 163 until the predetermined number of evaluators have input their replies. The determination control portion 206 stores and controls replies of functions for the next evaluator (in step 170).

When the operator determines that all the evaluators have input their replies and inputs "End of replying functions" through the input unit 202, the determination control portion 206 receives the input information and starts up a function relation score calculation portion 213 (in step 171).

Thereafter, when the determination control portion 206 receives a message representing "End of calculating relation scores" from the function relation score calculation portion 213 (in step 172), it starts up a selection object determination portion 214 (in step 173). When the determination control portion 206 receives a message representing "End of determination" from the selection object determination portion 214 (in step 174), it quits the process and passes the control to the system control portion 203 (in step 175).

The function data file 212 is used to store functions replied according to objects presented.

When the function relation score calculation portion 213 receives the start-up command from the determination control portion 206, it reads the content of the function data file 212 and calculates the relation score of each function replied. The function relation score calculation portion calculates the relation score of each function in accordance with the relation score calculation method described in the embodiment 1 as follows.

(1) weigh three functions replied according to each object by each evaluator with values "3", "2", and "1" in the input order, and (2) calculate the total weight designated to each function (total point=relation score of each function).

The function relation score calculation portion 213 stores the relation score values calculated in the above manner in a function relation score file 215 in accordance with a predetermined format. Thereafter, the function relation score calculation portion 213 sends a message representing "End of calculating function relation scores" to the determination control portion 206 and quits the process.

When the selection object determination portion 214 receives the start-up command from the determination control portion 206, it reads the content of the function relation score file 215 and sets a selection object flag to an object of a function with the highest relation score in all replied functions as a final selection object.

In addition, the selection object determination portion 214 causes the selected object and the relevant system function to be stored in the selection record file 220. Thereafter, the selection object determination portion 214 sends a message representing "End of determining selection object" to the determination control portion 206 and quits the process.

In this case, the selection object determination portion 214 gives a higher priority to the determination result in the direction <object→function> than to that in the direction <function→object> and stores the former in the selection record file 220. However, it should be noted that the latter determination result can be stored as auxiliary information together along with the former determination result.

The selection record file 220 stores in the format shown in FIG. 14 the object selection result where the relation of a relevant system function and selected objects is complementarily determined. The object selection result according to a particular function is stored in the selection record file 220 and are used as complementary information with which the users can designate objects according to functions. In the above-mentioned embodiment, when an object was selected in accordance with one system function, four data files which were the object data file 208, the object relation score file 211, the function data file 212, and the function relation score file 215 were created. After a final object was selected, these data files were rarely used. Thus, these files can be erased after a particular time elapsed.

In the above-mentioned embodiment, the calculation portion read replies of the evaluators as data. However, in this case, the evaluators should input objects or functions that they associated with functions or objects in a restricted input representation. For example, if there were an evaluator who associated an object "folder" with "put document away" and another evaluator who associated the object "folder" with "keep document", when they replied these functions, the system could not determine that these functions were synonymous with "store document". Thus, each evaluator should input this function with the expression of "store document".

To solve such troublesome input operation, it is possible to provide a Japanese processing portion (front end processor) which determines whether replies of evaluators are synonymous or not and whether these replies are synonymous with a relevant system function. For example, the Japanese processing portion which comprises a matching processing portion and synonym dictionary determines whether input words of the evaluators are synonymous or not.

Moreover, in the above-mentioned embodiment, the subject of association was each evaluator. The object selecting system performed another operation, that is, selected an adequate object by using relation scores of objects to be associated and associated elements. However, the part of association by the evaluators can be substituted with an association memory network constructed over a computer. For example, a neural network which has learned a particular number of reaction patterns of evaluators can be used as the association memory network. In this case, since the neural network selects from reactions of a plurality of evaluators an association pattern which can most commonly takes place and outputs this association pattern, the four files which are the object data file 208, the object relation score file 211, the function data file 212, and the function relation score file 215, can be omitted.

(Embodiment 3)

In the above-mentioned embodiment 2, the selection record file 220 stores an object selected in accordance with a particular function. Thus, when an object is selected in accordance with the same system function, if there is an object which was selected in the selection record file 220, the object is presented to the user (system designer). Thus, the redundant operation for selecting an object according to the same system function can be omitted.

However, as a method for using the selection record file 220 more effectively, the object selecting system can be connected to an icon pictorial pattern database. As a result, a total supporting system covering from the stage for determining an object used for a pictorial pattern of an icon to the stage for creating a real pictorial pattern can be provided. Next, a practical embodiment of such a system will be described.

Figure 15:
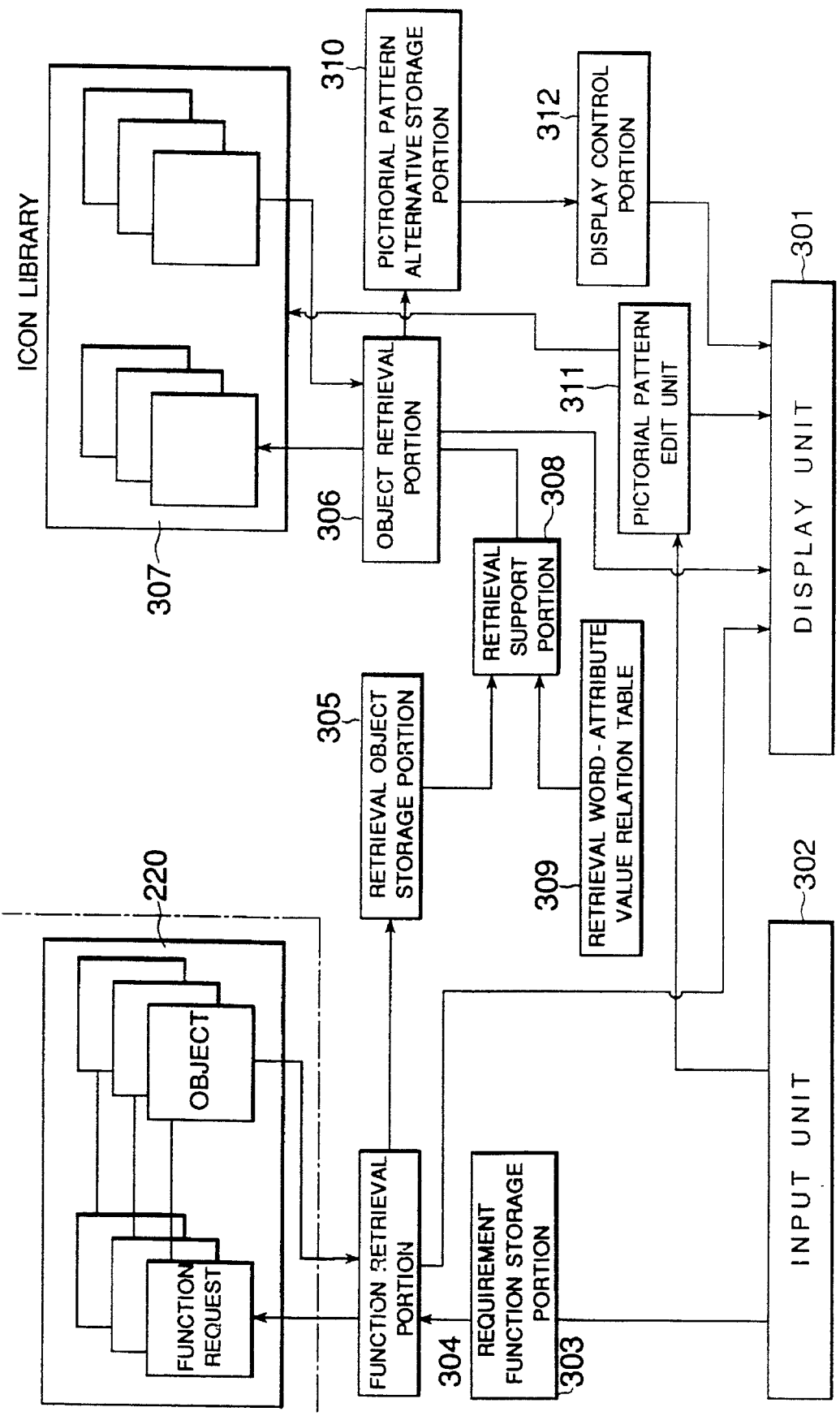
FIG. 15 is a block diagram showing the construction of a system of a third embodiment.

FIG. 15 is a block diagram showing an embodiment of the icon creation supporting system. Since the construction of the object selection file generation portion 200 was described in the above-mentioned embodiment, FIG. 15 only shows a selection record file 220.

A display unit 301 displays messages that the icon generation support system issues to the user, object names to be retrieved, pictorial patterns of icons according to objects retrieved, and so forth. An input unit 302 inputs commands, system functions, and edit commands of bit map images that the user issues to the icon generation support system.

A system function which is input from the input unit 302 is stored in a requirement function storage portion 303. A function retrieval portion 304 determines whether or not the system function stored in the requirement function storage portion 303 has been stored in the selection record file 220. When the system function has been stored, at least one object being selected in accordance with the system function is sent to a retrieval object record portion 305. Thus, an object retrieval portion 306 retrieves the selected object(s) from an icon library 307. In addition, the display unit 301 displays a list of the relevant objects and a message representing that pictorial patterns in accordance with these objects are being retrieved.

On the other hand, when the system function being input has not been stored in the selection record file 220, the display unit 301 displays a message representing so to the user (system designer).

The object retrieval portion 306 retrieves a bit map file with an attribute of the object stored in the retrieval object storage portion 305 from the icon library 307. At this point, a retrieval support portion 308 sends an attribute value of the retrieval word defined in a retrieval word—attribute value relation table 309 to the object retrieval portion 306. In other words, when "pencil" is stored in the retrieval object storage portion 305, the object retrieval portion 306 retrieves a bit map file with an attribute value of the object "pencil" defined in the retrieval value—attribute value relation table 309 from the icon library 307.

When relevant bit map files are retrieved from the icon library 307, these files are stored in the pictorial pattern alternative storage portion 310. On the other hand, when a bit map file with the attribute of the object to be retrieved has not been stored in the icon library 307, the display unit 301 displays a message representing so and prompts the user to start up a pictorial pattern edit unit 311 or quit the process.

Figure 16:
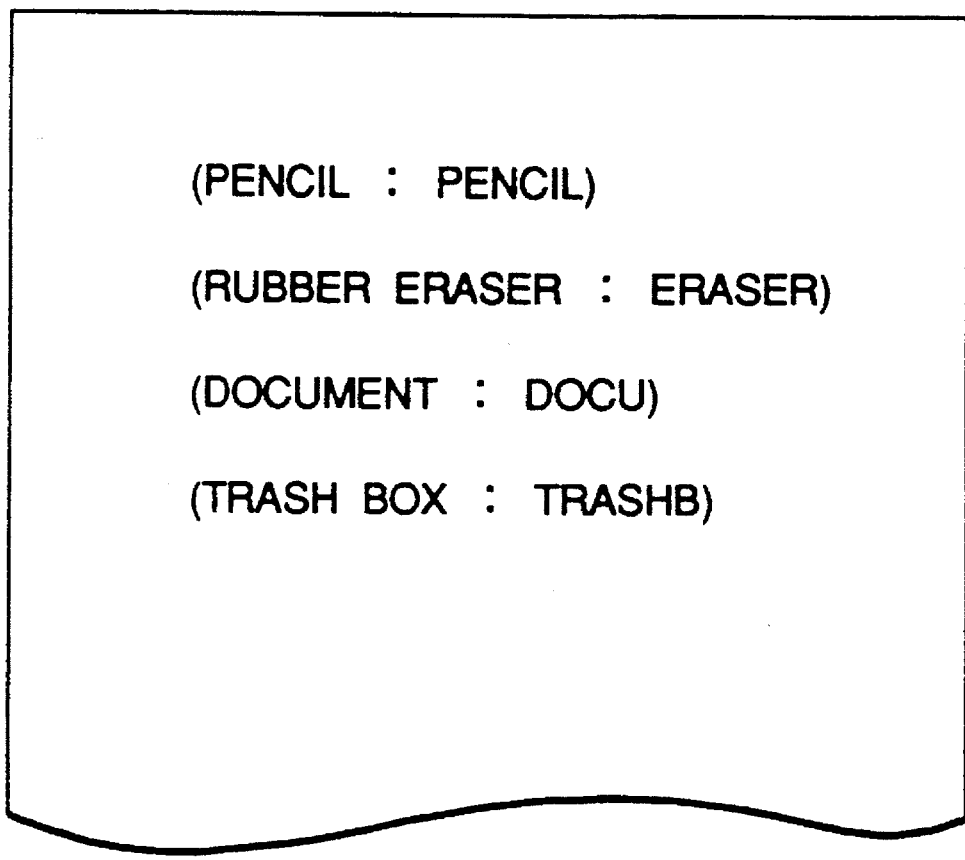
FIG. 16 is a view showing an example of a retrieval word—attribute value relation table.

The retrieval word—attribute value relation table 309 is a table which correlates object names stored in the selection record file 220 with abbreviated names defined as attribute values of bit map files stored in the icon library. As shown in FIG. 16, examples of abbreviated names are (pencil→pencil), (rubber eraser→eraser), (document→docu), and (trash box→trashb).

The icon library 307 stores in bit map files several types of pictorial patterns for each object stored in the selection record file 220. These files should be provided in such a way that they are distinguished by objects illustrated with pictorial patterns. As a most easily distinguishing method, file names are used. For example, when three bit-map files are created for the object "pencil", the object "pencil" is defined in the retrieval word—attribute value relation table 309 and the file names are designated as follows.

pencil1.btf
pencil2.btf
pencil3.btf

Thus, the object retrieval portion 306 determines the attribute value "pencil" of the retrieval object "pencil" in accordance with the retrieval word—attribute value relation table 309 received from the retrieval support portion 308 and extracts the file name containing "pencil" from the icon library 307. The bit map file name is stored in the pictorial pattern alternative storage portion 310. A display control portion 312 displays pictorial patterns of all bit map files extracted. In the next step, the system prompts the user (system designer) to select one of the following three operations which are for example:

(1) to copy one of pictorial patterns being displayed to an external storage unit, (2) to correct one of pictorial patterns being displayed, or (3) to create a new pictorial pattern rather than use one of those being displayed.

When the user selects the operation "to copy one of pictorial patterns being displayed to an external storage unit", the system sends the bit map file of the pictorial pattern that the user selects to the external storage unit that the user designates. When the user selects the operation "to correct one of pictorial patterns being displayed", the system reads the bit map file of the pictorial pattern that the user selects and starts up the pictorial pattern edit unit 311. On the other hand, when the user selects the operation "to create a new pictorial pattern", the system simply starts up the pictorial pattern edit unit 311.

By using the pictorial pattern edit unit 311, the user fills up a rectangle of a designated size with dots so as to create a desired pictorial pattern. The resultant pictorial pattern is stored in the bit map file 307. In the above-mentioned example, the file is stored with a file name "pencil4.btf".

In the above-mentioned embodiment of the icon design total supporting system, when the user inputs a function of which he wants to develop, since a plurality of pictorial patterns of objects which adequately represent the function are displayed, he can select a bit map file of a proper pictorial pattern as it is or use it with a minor change. As a result, the developing cost in the icon creating process can be remarkably reduced in comparison with that of the related art.

However, depending on the system to be developed, objects (or basic design) according to particular system functions have been sometimes predetermined due to its specifications or through past experience. In this case, by using an edit unit, system functions and objects which have the above-mentioned relation can be additionally defined in the selection record file 220 so as to omit the object selecting stage. Alternatively, by using the input unit 302, object names are input so that they are directly stored in the retrieval object storage portion 305. In the latter case, when the pictorial pattern retrieval operation is started up (a retrieval word is input), the system can prompt the user to select the retrieval operation using system functions or objects.

Industrial Utilization

According to the object selecting method of the present invention, since objects suitable for real using environment can be selected, they can have high reliability where users can correctly understand system functions thereof. As a result, this method is suitable for an icon selecting method of computer systems and so forth.

What is claimed is:

1. An object selecting method for selecting an object that comprises a pictorial pattern for use in designing a pictorial symbol representing a system function, said method comprising the steps of:

associating a system function with a plurality of objects representing pictorial symbols;

calculating a first relation of each associated object and said system function;

separating objects that strongly relate to said system function from other objects that weakly relate to the system function and removing said other objects from consideration in accordance with a predetermined criterion based on the strength of said first relation;

associating said separated objects with a functional element;

calculating a second relation of each associated functional element and said separated object with which it is associated; and selecting one object of said separated objects to be associated with said system function in accordance with a predetermined criterion based on said second relation and determining said one object representing said system function.

2. The method as set forth in claim 1, further comprising the step of:

extracting one or more pictorial symbols in accordance with the selected object from an icon library that stores a plurality of pictorial symbols.

3. The method as set forth in claim 2, further comprising the step of:

selecting one mode among an operation mode, a correction mode, and a creation mode, the operation mode including the step of copying the extracted pictorial symbol to an external storage unit, the correction mode including the step of correcting the extracted pictorial symbol, and the creation mode including the step of creating a new pictorial symbol.

4. The object selecting method according to claim 1, wherein the association of said first step and said fourth step is performed from a plurality of view points.

5. The object selecting method according to claim 1, wherein each associated object of said first relation calculating step and each associated element of said second relation calculating step is weighed in accordance with the strength of relation between an object to be associated and a system function or between said object and a functional element being associated and further weighed in accordance with indexes of association strength such as reaction time, reaction order, and reaction frequency.

6. The object selecting method according to claim 1, further comprising the steps of:

storing an object selected in accordance with a system function in a file; and retrieving objects from said file before selecting objects according to a requested system function and presenting the objects when they have been registered in said file.

7. An object selecting method for selecting objects as pictorial symbols representing a system function, said method comprising the steps of:

determining objects in accordance with a predetermined function as a first determination;

determining a function in accordance with said objects determined in said first determination as a second determination;

separating likely objects from other objects and removing said other objects from consideration; and selecting one of said likely objects in accordance with a predetermined function by complementarily using both a result of said first determination and a result of said second determination.

8. The object selecting method according to claim 7, wherein a result of said second determination has precedence over a result of said first determination so as to select an object in accordance with the predetermined function.

* * * * *